(12) United States Patent
Araki et al.

(10) Patent No.: US 8,900,466 B2
(45) Date of Patent: Dec. 2, 2014

(54) METHOD OF MANUFACTURING A NEAR-FIELD LIGHT GENERATOR INCLUDING A WAVEGUIDE AND A PLASMON GENERATOR

(71) Applicants: Hironori Araki, Milpitas, CA (US); Yoshitaka Sasaki, Santa Clara, CA (US); Hiroyuki Ito, Milpitas, CA (US); Seiichiro Tomita, Milpitas, CA (US); Shigeki Tanemura, Milpitas, CA (US); Kazumasa Yasuda, Sunnyvale, CA (US)

(72) Inventors: Hironori Araki, Milpitas, CA (US); Yoshitaka Sasaki, Santa Clara, CA (US); Hiroyuki Ito, Milpitas, CA (US); Seiichiro Tomita, Milpitas, CA (US); Shigeki Tanemura, Milpitas, CA (US); Kazumasa Yasuda, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 121 days.

(21) Appl. No.: 13/851,603

(22) Filed: Mar. 27, 2013

(65) Prior Publication Data

US 2014/0291284 A1    Oct. 2, 2014

(51) Int. Cl.
 *B29D 11/00* (2006.01)
 *G02B 6/122* (2006.01)

(52) U.S. Cl.
 CPC .................. *G02B 6/1226* (2013.01)
 USPC ............................ 216/24; 216/22

(58) Field of Classification Search
 USPC .................................. 216/24, 22
 See application file for complete search history.

(56) References Cited

U.S. PATENT DOCUMENTS

| | | | |
|---|---|---|---|
| 8,366,948 B2* | 2/2013 | Sasaki et al. | 216/22 |
| 8,400,884 B1* | 3/2013 | Araki et al. | 369/13.02 |
| 8,454,848 B2* | 6/2013 | Sasaki et al. | 216/24 |
| 2008/0002293 A1 | 1/2008 | Sasaki et al. | |
| 2011/0170381 A1 | 7/2011 | Matsumoto | |
| 2011/0303637 A1 | 12/2011 | Araki et al. | |

FOREIGN PATENT DOCUMENTS

| | | |
|---|---|---|
| JP | A-2007-287313 | 11/2007 |
| JP | A-2010-061715 | 3/2010 |
| JP | A-2012-003830 | 1/2012 |

OTHER PUBLICATIONS

Office Action issued in Japanese Patent Application No. 2013-223048 dated Jul. 23, 2014 (with translation).

* cited by examiner

*Primary Examiner* — Roberts Culbert
(74) *Attorney, Agent, or Firm* — Oliff PLC (57) ABSTRACT

In a method of manufacturing a near-field light generator, a structure including a core and a polishing stopper layer disposed on the top surface of the core is formed on a first cladding layer. Next, a cladding material layer is formed to cover the first cladding layer and the structure. The cladding material layer is then polished until the polishing stopper layer is exposed. Next, the polishing stopper layer is removed so that the cladding material layer has a protruding portion protruding upward to a higher level than the top surface of the core. The cladding material layer is then polished so as to remove the protruding portion and thereby make the cladding material layer into a second cladding layer. Then, a third cladding layer and a plasmon generator are formed.

12 Claims, 8 Drawing Sheets

METHOD OF MANUFACTURING A NEAR-FIELD LIGHT GENERATOR INCLUDING A WAVEGUIDE AND A PLASMON GENERATOR

BACKGROUND OF THE INVENTION

1. Field of the Invention

The present invention relates to a method of manufacturing a near-field light generator for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider. The waveguide includes a core through which light propagates, and a cladding provided around the core.

The plasmon generator has a front end face located in the medium facing surface. The front end face generates near-field light. Surface plasmons are excited on the plasmon generator and propagate along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a technology in which the surface of the core of the waveguide and the surface of a metallic structure (plasmon generator) are arranged to face each other with a gap therebetween, and evanescent light that occurs at the surface of the core based on the light propagating through the core is used to excite surface plasmons on the metallic structure, so that near-field light is generated based on the excited surface plasmons.

In order to reduce the track width of a recording medium for higher recording density, it is required to reduce the near-field light in spot diameter at the recording medium. To achieve this, it is required to reduce the width and height of the front end face of the plasmon generator. Note that the width of the front end face refers to the dimension of the front end face in the track width direction, and the height of the front end face refers to the dimension of the front end face in the direction in which the tracks extend. The width and height of the front end face are both preferably 50 nm or smaller.

Here, a device that includes a waveguide and a plasmon generator and generates near-field light will be referred to as a near-field light generator. For the structure of the near-field light generator, the structure in which the plasmon generator is disposed above the top surface of the core of the waveguide, as disclosed in U.S. Patent Application Publication No. 2011/0170381 A1, is conceivable.

The near-field light generator having the above-described structure can be manufactured by the following method, for example. A first cladding layer to underlie the core is formed first. Then, the core is formed on the first cladding layer. The core has a bottom surface, a top surface opposite thereto, and two side surfaces connecting the top and bottom surfaces to each other. Next, a second cladding layer is formed to cover the first cladding layer and the core. The second cladding layer is then polished so that the top surface of the core is exposed. The second cladding layer contacts the two side surfaces of the core. Then, a third cladding layer is formed over the core and the second cladding layer. Next, a plasmon generator, and a dielectric layer lying therearound are formed on the third cladding layer. The plasmon generator and the dielectric layer are then polished to determine the thickness of the plasmon generator. For example, chemical mechanical polishing (hereinafter referred to as CMP) is used for the polishing of the second cladding layer and the polishing of the plasmon generator and the dielectric layer. The first to third cladding layers constitute the cladding.

The thickness of the plasmon generator has an influence on its performance and therefore must be controlled accurately. The above-described manufacturing method for the near-field light generator, however, has a problem that hampers accurate control of the thickness of the plasmon generator. The problem will now be described.

In the above-described manufacturing method for the near-field light generator, the thickness of the plasmon generator is determined in the step of polishing the plasmon generator and the dielectric layer. In order to control the thickness of the plasmon generator accurately, the flatness of the top surface of each of the plasmon generator and the dielectric layer after the step of polishing the plasmon generator and the dielectric layer must be improved. The flatness of the top surface of each of the plasmon generator and the dielectric layer is affected by the shape of the top surface of each of the core and the second cladding layer. Therefore, to control the thickness of the plasmon generator accurately, the flatness of the top surface of each of the core and the second cladding layer after the step of polishing the second cladding layer must be improved.

In the above-described manufacturing method for the near-field light generator, however, the difference between the materials used for the core and the second cladding layer generates a difference in level between the top surface of the core and the top surface of the second cladding layer or causes the top surface of the core to curve, so that the flatness of the top surface of each of the core and the second cladding layer is low after the step of polishing the second cladding layer. As a result, the flatness of the top surface of each of the plasmon generator and the dielectric layer is also low after the step of polishing the plasmon generator and the dielectric layer.

OBJECT AND SUMMARY OF THE INVENTION

It is an object of the present invention to provide a method of manufacturing a near-field light generator and a method of manufacturing a waveguide included in the near-field light generator, the methods allowing an improvement in the flatness of the top surface of the core and the top surface of the cladding layer in contact with the two side surfaces of the core.

A near-field light generator manufactured by a manufacturing method of the present invention includes a waveguide and a plasmon generator. The waveguide includes a core through which light propagates, and a cladding provided around the core. The core has a bottom surface, a top surface opposite to the bottom surface, and two side surfaces connecting the top and bottom surfaces to each other. The cladding includes a first cladding layer in contact with the bottom surface of the core, a second cladding layer in contact with the two side surfaces of the core, and a third cladding layer in contact with the top surface of the core. The plasmon generator is disposed above the top surface of the core and has a plasmon exciting part configured to excite a surface plasmon through coupling with evanescent light generated from the top surface of the core, and a front end face that generates near-field light based on the surface plasmon.

The manufacturing method for the near-field light generator of the present invention includes: a step of forming the first cladding layer; a step of forming a structure on the first cladding layer, the structure including the core and a polishing stopper layer disposed on the top surface of the core; a step of forming a cladding material layer to cover the first cladding layer and the structure, the cladding material layer becoming the second cladding layer later; a first polishing step of polishing the cladding material layer until the polishing stopper layer is exposed; a step of removing the polishing stopper layer after the first polishing step so that the cladding material layer has a protruding portion protruding upward to a higher level than the top surface of the core; a second polishing step of polishing the cladding material layer after the step of removing the polishing stopper layer so as to remove the protruding portion and thereby make the cladding material layer into the second cladding layer; and a step of forming the third cladding layer and the plasmon generator after the second polishing step.

A waveguide manufactured by a manufacturing method of the present invention is included in a near-field light generator. The near-field light generator includes the waveguide and a plasmon generator. The waveguide includes a core through which light propagates, and a cladding provided around the core. The core has a bottom surface, a top surface opposite to the bottom surface, and two side surfaces connecting the top and bottom surfaces to each other. The cladding includes a first cladding layer in contact with the bottom surface of the core, a second cladding layer in contact with the two side surfaces of the core, and a third cladding layer in contact with the top surface of the core. The plasmon generator is disposed above the top surface of the core and has a plasmon exciting part configured to excite a surface plasmon through coupling with evanescent light generated from the top surface of the core, and a front end face that generates near-field light based on the surface plasmon.

The manufacturing method for the waveguide of the present invention includes: a step of forming the first cladding layer; a step of forming a structure on the first cladding layer, the structure including the core and a polishing stopper layer disposed on the top surface of the core; a step of forming a cladding material layer to cover the first cladding layer and the structure, the cladding material layer becoming the second cladding layer later; a first polishing step of polishing the cladding material layer until the polishing stopper layer is exposed; a step of removing the polishing stopper layer after the first polishing step so that the cladding material layer has a protruding portion protruding upward to a higher level than the top surface of the core; a second polishing step of polishing the cladding material layer after the step of removing the polishing stopper layer so as to remove the protruding portion and thereby make the cladding material layer into the second cladding layer; and a step of forming the third cladding layer after the second polishing step.

In the manufacturing method for the near-field light generator and the manufacturing method for the waveguide of the present invention, the first polishing step and the second polishing step may be performed by chemical mechanical polishing.

In the manufacturing method for the near-field light generator and the manufacturing method for the waveguide of the present invention, the step of forming the structure may include: a step of forming a core material layer on the first cladding layer, the core material layer becoming the core later; a step of forming the polishing stopper layer on the core material layer; and a step of etching the core material layer using the polishing stopper layer as a mask so that the core material layer is patterned into the core.

In the manufacturing method for the near-field light generator and the manufacturing method for the waveguide of the present invention, the step of removing the polishing stopper layer may be performed by reactive ion etching.

In the manufacturing method for the near-field light generator and the manufacturing method for the waveguide of the present invention, the step of forming the structure may form a first auxiliary structure and a second auxiliary structure in addition to the structure, the first and second auxiliary structures being spaced from the structure and disposed on the first cladding layer such that the structure lies between the first and second auxiliary structures. The first auxiliary structure includes a first dummy core formed of the same material as the core, and a first auxiliary polishing stopper layer disposed on the first dummy core. The second auxiliary structure includes a second dummy core formed of the same material as the core, and a second auxiliary polishing stopper layer disposed on the second dummy core. In the step of forming the cladding material layer, the cladding material layer is formed to cover the first cladding layer, the structure, the first auxiliary structure and the second auxiliary structure. In the first polishing step, the cladding material layer is polished until the polishing stopper layer, the first auxiliary polishing stopper layer and the second auxiliary polishing stopper layer are exposed. In the step of removing the polishing stopper layer, the first and second auxiliary polishing stopper layers are removed in addition to the polishing stopper layer.

Where the first and second auxiliary structures are formed in addition to the structure, the step of forming the structure may include: a step of forming a core material layer on the first cladding layer, the core material layer becoming the core, the first dummy core and the second dummy core later; a step of forming the polishing stopper layer, the first auxiliary polishing stopper layer and the second auxiliary polishing stopper layer on the core material layer; and a step of etching the core material layer using the polishing stopper layer, the first auxiliary polishing stopper layer and the second auxiliary polishing stopper layer as masks so that the core material layer is patterned into the core, the first dummy core and the second dummy core.

In the manufacturing method for the near-field light generator and the manufacturing method for the waveguide of the present invention, the polishing stopper layer is removed after the first polishing step so that the cladding material layer has the protruding portion. Thereafter, the cladding material layer is polished so that the protruding portion is removed and the cladding material layer is thereby made into the second cladding layer. According to the present invention, it is thereby possible to improve the flatness of the top surface of the core and the top surface of the second cladding layer in contact with the two side surfaces of the core.

Other and further objects, features and advantages of the present invention will appear more fully from the following description.

DETAILED DESCRIPTION OF THE PREFERRED EMBODIMENT

Figure 2:
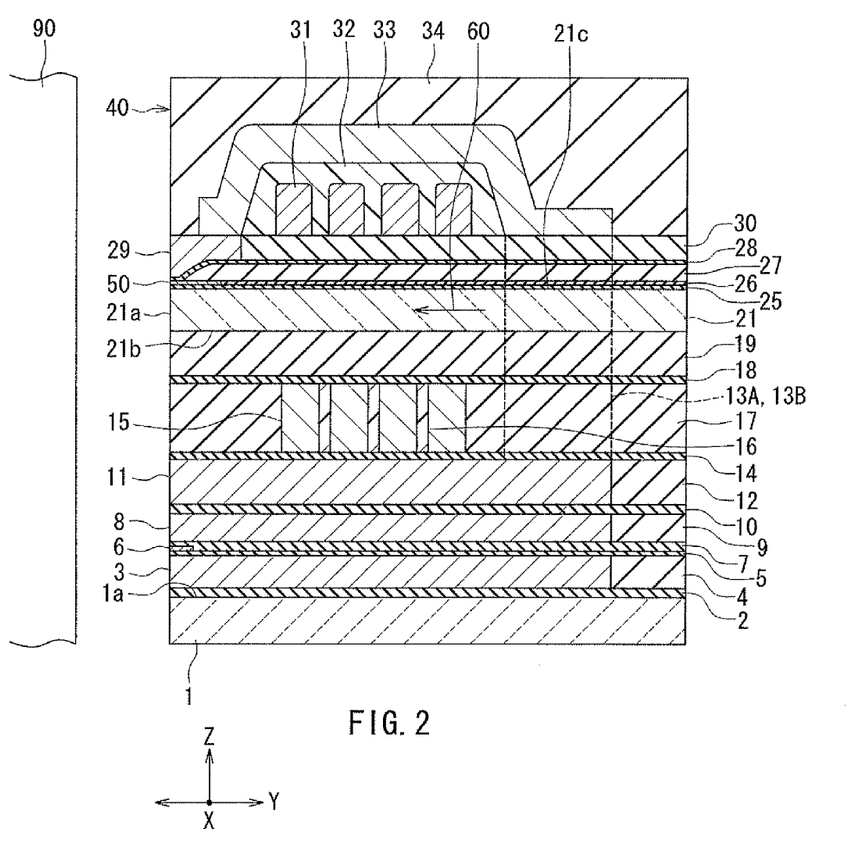
FIG. 2 is a cross-sectional view showing the configuration of a thermally-assisted magnetic recording head of the embodiment of the invention.
Figure 3:
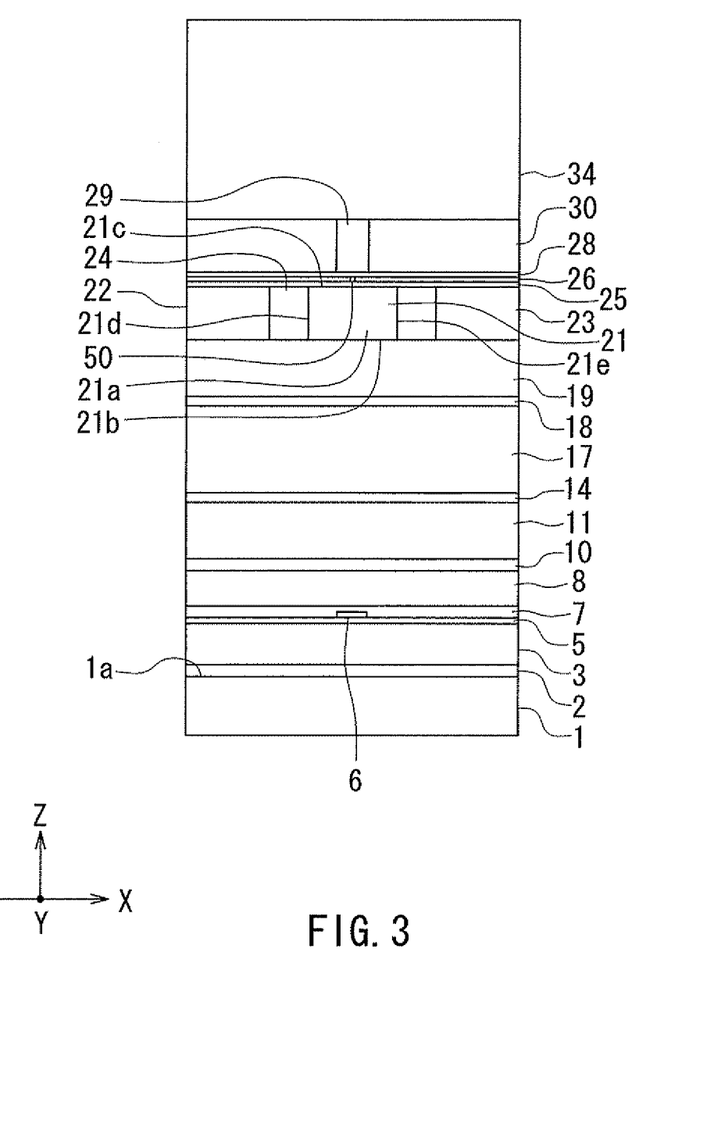
FIG. 3 is a front view showing the medium facing surface of the thermally-assisted magnetic recording head of the embodiment of the invention.

An embodiment of the present invention will now be described in detail with reference to the drawings. First, reference is made to FIG. 2 and FIG. 3 to describe the configuration of a thermally-assisted magnetic recording head of the embodiment of the invention. FIG. 2 is a cross-sectional view showing the configuration of the thermally-assisted magnetic recording head. FIG. 3 is a front view showing the medium facing surface of the thermally-assisted magnetic recording head.

The thermally-assisted magnetic recording head of the embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 2, the thermally-assisted magnetic recording head has a medium facing surface 40 facing a recording medium 90. Here, X direction, Y direction, and Z direction will be defined as follows. The X direction is the direction across the tracks of the recording medium 90, i.e., the track width direction. The Y direction is a direction perpendicular to the medium facing surface 40. The Z direction is the direction of travel of the recording medium 90 as viewed from the slider. The X, Y, and Z directions are orthogonal to one another.

As shown in FIG. 2 and FIG. 3, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material and disposed on the top surface 1a of the substrate 1; a bottom shield layer 3 formed of a magnetic material and disposed on the insulating layer 2; and an insulating layer 4 disposed on the insulating layer 2 and surrounding the bottom shield layer 3. The insulating layers 2 and 4 are formed of alumina ($Al_2O_3$), for example. The Z direction is also a direction perpendicular to the top surface 1a of the substrate 1.

The thermally-assisted magnetic recording head further includes: a bottom shield gap film 5 which is an insulating film disposed over the top surfaces of the bottom shield layer 3 and the insulating layer 4; a magnetoresistive (MR) element 6 serving as a read element disposed on the bottom shield gap film 5; two leads (not illustrated) connected to the MR element 6; and a top shield gap film 7 which is an insulating film disposed on the MR element 6.

An end of the MR element 6 is located in the medium facing surface 40. The MR element 6 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The thermally-assisted magnetic recording head further includes a top shield layer 8 formed of a magnetic material and disposed on the top shield gap film 7, and an insulating layer 9 disposed on the top shield gap film 7 and surrounding the top shield layer 8. The insulating layer 9 is formed of alumina, for example. The parts from the bottom shield layer 3 to the top shield layer 8 constitute a read head section.

The thermally-assisted magnetic recording head further includes a nonmagnetic layer 10 formed of a nonmagnetic material and disposed over the top shield layer 8 and the insulating layer 9, a return pole layer 11 formed of a magnetic material and disposed on the nonmagnetic layer 10, and an insulating layer 12 disposed on the nonmagnetic layer 10 and surrounding the return pole layer 11. The return pole layer 11 has an end face located in the medium facing surface 40. The nonmagnetic layer 10 and the insulating layer 12 are formed of alumina, for example.

The thermally-assisted magnetic recording head further includes two coupling portions 13A and 13B disposed away from the medium facing surface 40 and lying on a part of the return pole layer 11, an insulating layer 14 disposed on another part of the return pole layer 11 and on the insulating layer 12, and a coil 15 disposed on the insulating layer 14. The coupling portions 13A and 13B are formed of a magnetic material. Each of the coupling portions 13A and 13B has a first layer located on the return pole layer 11, and a second, a third, and a fourth layer stacked in this order on the first layer. The first layer of the coupling portion 13A and the first layer of the coupling portion 13B are arranged to align in the track width direction (the X direction). The coil 15 is planar spiral-shaped and wound around the first layers of the coupling portions 13A and 13B. The coil 15 is formed of a conductive material such as copper. The insulating layer 14 is formed of alumina, for example.

The thermally-assisted magnetic recording head further includes an insulating layer 16 disposed in the space between every adjacent turns of the coil 15, an insulating layer 17 disposed around the coil 15, and an insulating layer 18 disposed over the coil 15 and the insulating layers 16 and 17. The insulating layer 16 is formed of photoresist, for example. The insulating layers 17 and 18 are formed of alumina, for example. The first layers of the coupling portions 13A and 13B are embedded in the insulating layers 14 and 17.

The thermally-assisted magnetic recording head further includes a waveguide including a core 21 and a cladding provided around the core 21. The core 21 has an end face 21a that is closer to the medium facing surface 40, a bottom surface 21b, a top surface 21c opposite to the bottom surface 21b, and two side surfaces 21d and 21e connecting the bottom surface 21b and the top surface 21c to each other. The end face 21a may be located in the medium facing surface 40 or at a distance from the medium facing surface 40. FIG. 2 and FIG. 3 illustrate an example in which the end face 21a is located in the medium facing surface 40.

The cladding includes a first cladding layer 19, a second cladding layer 24, and a third cladding layer 25. The first cladding layer 19 is disposed on the insulating layer 18. The core 21 is disposed on the first cladding layer 19. The second cladding layer 24 is disposed on the first cladding layer 19 and surrounds the core 21. The top surface 21c of the core 21 and the top surface of the second cladding layer 24 are flattened. The third cladding layer 25 is disposed over the top surface 21c of the core 21 and the top surface of the second cladding layer 24.

The core 21 is formed of a dielectric material that transmits laser light to be used for generating near-field light. The laser light emitted from a laser diode (not illustrated) enters the core 21 and propagates through the core 21. The first to third cladding layers 19, 24 and 25 are each formed of a dielectric material that has a refractive index lower than that of the core 21. For example, the core 21 can be formed of tantalum oxide such as $Ta_2O_5$, SiON, or niobium oxide. The first to third cladding layers 19, 24 and 25 can be formed of alumina or $SiO_2$.

The thermally-assisted magnetic recording head further includes a first dummy core 22 and a second dummy core 23 spaced from the core 21 and disposed on the first cladding layer 19 such that the core 21 lies between the first and second dummy cores 22 and 23. More specifically, the first and second dummy cores 22 and 23 are located on opposite sides of the core 21 in the track width direction. The first dummy core 22 is disposed such that the side surface 21d of the core 21 lies between the first dummy core 22 and the track-widthwise center of the core 21. The second dummy core 23 is disposed such that the side surface 21e of the core 21 lies between the second dummy core 23 and the track-widthwise center of the core 21. The first and second dummy cores 22 and 23 are embedded in the second cladding layer 24. The first and second dummy cores 22 and 23 are formed of the same material as the core 21.

The second layers of the coupling portions 13A and 13B are embedded in the insulating layer 18 and the first cladding layer 19. The third layers of the coupling portions 13A and 13B are embedded in the second cladding layer 24. The third layer of the coupling portion 13A is disposed such that the first dummy core 22 lies between the core 21 and the third layer of the coupling portion 13A. The third layer of the coupling portion 13B is disposed such that the second dummy core 23 lies between the core 21 and the third layer of the coupling portion 13B.

The thermally-assisted magnetic recording head further includes a plasmon generator 50. The plasmon generator 50 lies on the third cladding layer 25 such that the third cladding layer 25 is interposed between the plasmon generator 50 and the top surface 21c of the core 21. The plasmon generator 50 is formed of metal. More specifically, the plasmon generator 50 is formed of, for example, one of Au, Ag, Al, Cu, Pd, Pt, Rh and Ir, or an alloy composed of two or more of these elements. The shape of the plasmon generator 50 will be described in detail later.

The thermally-assisted magnetic recording head further includes a dielectric layer 26 disposed on the third cladding layer 25 and surrounding the plasmon generator 50, a dielectric layer 27 disposed to cover the dielectric layer 26 and part of the plasmon generator 50, and a dielectric layer 28 disposed over the plasmon generator 50 and the dielectric layer 27. The dielectric layer 27 has a top surface and an end face closest to the medium facing surface 40. The distance from the medium facing surface 40 to an arbitrary point on the aforementioned end face of the dielectric layer 27 decreases with decreasing distance from the arbitrary point to the top surface 1a of the substrate 1. The dielectric layers 26 to 28 are formed of alumina, for example.

The thermally-assisted magnetic recording head further includes a main pole 29 formed of a magnetic material and disposed such that the plasmon generator 50 lies between the main pole 29 and the core 21, and a dielectric layer 30 disposed around the main pole 29. The main pole 29 is disposed on the dielectric layer 28 and lies above part of each of the top surface of the plasmon generator 50, the end face of the dielectric layer 27 and the top surface of the dielectric layer 27. The main pole 29 has a front end face located in the medium facing surface 40, a bottom surface, and a top surface. The fourth layers of the coupling portions 13A and 13B are embedded in the third cladding layer 25 and the dielectric layers 26 to 28 and 30. The top surfaces of the main pole 29, the dielectric layer 30, and the fourth layers of the coupling portions 13A and 13B are flattened. The dielectric layer 30 is formed of $SiO_2$, for example.

The thermally-assisted magnetic recording head further includes a coil 31 disposed on the dielectric layer 30, an insulating layer 32 disposed to cover the coil 31, and a yoke layer 33 formed of a magnetic material and disposed over the main pole 29, the coupling portions 13A and 13B, the dielectric layer 30 and the insulating layer 32. The yoke layer 33 magnetically couples the main pole 29 to the coupling portions 13A and 13B. The coil 31 is planar spiral-shaped and wound around portions of the yoke layer 33 that lie on the coupling portions 13A and 13B. The coil 31 is formed of a conductive material such as copper. The insulating layer 32 is formed of photoresist, for example.

The thermally-assisted magnetic recording head further includes a protective layer 34 disposed to cover the yoke layer 33. The protective layer 34 is formed of alumina, for example.

The parts from the return pole layer 11 to the yoke layer 33 constitute a write head section. The coils 15 and 31 produce magnetic fields corresponding to data to be written on the recording medium 90. The return pole layer 11, the coupling portions 13A and 13B, the yoke layer 33, and the main pole 29 form a magnetic path for passing magnetic fluxes corresponding to the magnetic fields produced by the coils 15 and 31. The coils 15 and 31 are connected in series or in parallel so that the magnetic flux corresponding to the magnetic field produced by the coil 15 and the magnetic flux corresponding to the magnetic field produced by the coil 31 flow in the same direction through the main pole 29. The main pole 29 allows the magnetic flux corresponding to the magnetic field produced by the coil 15 and the magnetic flux corresponding to the magnetic field produced by the coil 31 to pass, and produces a write magnetic field for writing data on the recording medium 90 by means of a perpendicular magnetic recording system.

As has been described, the thermally-assisted magnetic recording head of the embodiment includes the medium facing surface 40, the read head section, and the write head section. The read head section and the write head section are stacked on the substrate 1. The write head section is located on the front side in the direction of travel of the recording medium 90 (the Z direction), i.e., on the trailing side, relative to the read head section.

The write head section includes the coils 15 and 31, the main pole 29, the waveguide, and the plasmon generator 50. The waveguide includes the core 21 through which light propagates, and the cladding provided around the core 21. In the embodiment, in particular, the core 21 allows laser light emitted from a non-illustrated laser diode to propagate through. The cladding includes the first to third cladding layers 19, 24 and 25.

The core 21 has the end face 21a, the bottom surface 21b, the top surface 21c, and the two side surfaces 21d and 21e. The first cladding layer 19 is in contact with the bottom surface 21b of the core 21. The second cladding layer 24 is in contact with the two side surfaces 21d and 21e of the core 21. The third cladding layer 25 is in contact with the top surface 21c of the core 21. The plasmon generator 50 is disposed above the top surface 21c of the core 21 such that the third cladding layer 25 is interposed between the plasmon generator 50 and the core 21.

A near-field light generator according to the embodiment includes the waveguide having the core 21 and the cladding, and the plasmon generator 50.

Figure 1:
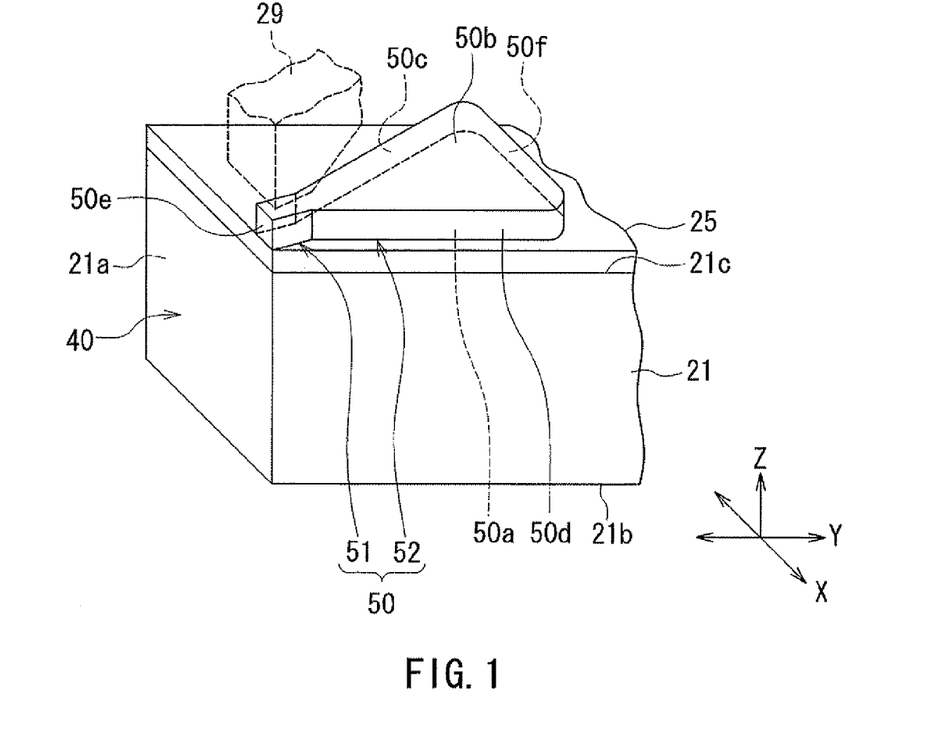
FIG. 1 is a perspective view showing the main part of a near-field light generator according to an embodiment of the invention.

Now, the shape of the plasmon generator 50 will be described in detail with reference to FIG. 1. FIG. 1 is a perspective view showing the main part of the near-field light generator. As shown in FIG. 1, the plasmon generator 50 has a plasmon exciting part 50a or a bottom surface, a top surface 50b, two side surfaces 50c and 50d, a front end face 50e, and a rear end face 50f. The front end face 50e is located in the medium facing surface 40 and connects the plasmon exciting part 50a, the top surface 50b and the two side surfaces 50c and 50d to each other. The front end face 50e generates near-field light on the principle to be described later. For example, the plasmon generator 50 is rectangular in cross section parallel to the medium facing surface 40. The thickness (the dimension in the Z direction) of the plasmon generator 50 is generally constant regardless of the distance from the medium facing surface 40.

Further, as shown in FIG. 1, the plasmon generator 50 includes a narrow portion 51 located near the medium facing surface 40, and a wide portion 52 that is located farther from the medium facing surface 40 than is the narrow portion 51. The width of the narrow portion 51 in the direction parallel to the medium facing surface 40 and to the top surface 21c of the core 21 (the X direction) may be constant regardless of the distance from the medium facing surface 40 or may decrease toward the medium facing surface 40. The wide portion 52 is located on a side of the narrow portion 51 farther from the front end face 50e and is connected to the narrow portion 51. The width of the wide portion 52 in the track width direction (the X direction) is equal to that of the narrow portion 51 at the boundary between the narrow portion 51 and the wide portion 52, and is greater than that of the narrow portion 51 in the other positions.

The width (the dimension in the track width direction (the X direction)) of the front end face 50e is defined by the width of the narrow portion 51 in the medium facing surface 40. The width of the front end face 50e falls within the range of 5 to 40 nm, for example. The height (the dimension in the Z direction) of the front end face 50e is defined by the height of the narrow portion 51 in the medium facing surface 40. The height of the front end face 50e falls within the range of 5 to 40 nm, for example.

Now, the principle of generation of near-field light in the embodiment and the principle of thermally-assisted magnetic recording using the near-field light will be described in detail. Laser light emitted from a laser diode (not illustrated) enters the core 21. As shown in FIG. 2, the laser light 60 propagates through the core 21 toward the medium facing surface 40, and reaches the vicinity of the plasmon generator 50. The top surface 21c of the core 21 generates evanescent light based on the laser light 60 propagating through the core 21. More specifically, the laser light 60 is totally reflected at the top surface 21c, and this cause the top surface 21c to generate evanescent light permeating into the third cladding layer 25. In the plasmon generator 50, surface plasmons are excited on the plasmon exciting part 50a through coupling with the evanescent light. The surface plasmons propagate to the front end face 50e, and near-field light is generated from the front end face 50e based on the surface plasmons.

The near-field light generated from the front end face 50e is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 29 for data writing.

In the embodiment, the plasmon generator 50 has the narrow portion 51 and the wide portion 52. The embodiment allows a larger area of the plasmon exciting part 50a to be opposed to the top surface 21c of the core 21 to allow more surface plasmons to be excited than in the case where the wide portion 52 is not provided. Consequently, according to the embodiment, it is possible to generate near-field light of sufficient intensity.

A method of manufacturing the thermally-assisted magnetic recording head of the embodiment will now be described with reference to FIG. 2 and FIG. 3. The method of manufacturing the thermally-assisted magnetic recording head of the embodiment includes the steps of forming components of a plurality of thermally-assisted magnetic recording heads other than the substrates 1 on a wafer that includes portions to become the substrates 1 of the plurality of thermally-assisted magnetic recording heads, thereby fabricating a substructure that includes rows of a plurality of pre-head portions, the plurality of pre-head portions becoming the plurality of thermally-assisted magnetic recording heads later; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 40.

The method of manufacturing the thermally-assisted magnetic recording head of the embodiment will now be described in more detail with attention focused on a single thermally-assisted magnetic recording head. In the method of manufacturing the thermally-assisted magnetic recording head of the embodiment, first, the insulating layer 2 is formed on the substrate 1. The bottom shield layer 3 is then formed on the insulating layer 2. Next, the insulating layer 4 is formed to cover the bottom shield layer 3. The insulating layer 4 is then polished by, for example, CMP, until the bottom shield layer 3 is exposed.

Next, the bottom shield gap film 5 is formed over the bottom shield layer 3 and the insulating layer 4. Next, the MR element 6 and two leads (not illustrated) connected to the MR element 6 are formed on the bottom shield gap film 5. The top shield gap film 7 is then formed to cover the MR element 6 and the leads. The top shield layer 8 is then formed on the top shield gap film 7. Next, the insulating layer 9 is formed to cover the top shield layer 8. The insulating layer 9 is then polished by, for example, CMP, until the top shield layer 8 is exposed.

Next, the nonmagnetic layer 10 is formed over the top shield layer 8 and the insulating layer 9. The return pole layer 11 is then formed on the nonmagnetic layer 10. Next, the insulating layer 12 is formed to cover the return pole layer 11. The insulating layer 12 is then polished by, for example, CMP, until the return pole layer 11 is exposed. Next, the insulating layer 14 is formed over the return pole layer 11 and the insulating layer 12.

The insulating layer 14 is then selectively etched to form therein two openings for exposing the top surface of the return pole layer 11. Next, the first layers of the coupling portions 13A and 13B are formed on the return pole layer 11 at the positions of the two openings. Next, the coil 15 is formed on the insulating layer 14. The insulating layer 16 is then formed in the space between every adjacent turns of the coil 15. Next, the insulating layer 17 is formed over the entire top surface of the stack. The insulating layer 17 is then polished by, for example, CMP, until the first layers of the coupling portions 13A and 13B, the coil 15, and the insulating layer 16 are exposed. The top surfaces of the first layers of the coupling portions 13A and 13B, the coil 15, and the insulating layers 16 and 17 are thereby flattened. Next, the insulating layer 18 is formed over the first layers of the coupling portions 13A and 13B, the coil 15, and the insulating layers 16 and 17.

The insulating layer 18 is then selectively etched to form therein two openings for exposing the top surfaces of the first layers of the coupling portions 13A and 13B. Next, the second layers of the coupling portions 13A and 13B are formed on the first layers of the coupling portions 13A and 13B. Next, the first cladding layer 19 is formed to cover the second layers of the coupling portions 13A and 13B. The first cladding layer 19 is then polished by, for example, CMP, until the second layers of the coupling portions 13A and 13B are exposed. Next, the third layers of the coupling portions 13A and 13B are formed on the second layers of the coupling portions 13A and 13B.

Then, the core 21, the first dummy core 22, the second dummy core 23, the second cladding layer 24, the third cladding layer 25, the dielectric layer 26, and the plasmon generator 50 are formed on the first cladding layer 19. This process will be described in detail later.

Next, the dielectric layer 27 is formed on the dielectric layer 26 and part of the plasmon generator 50. The dielectric layer 28 is then formed on the plasmon generator 50 and the dielectric layer 27. The third cladding layer 25 and the dielectric layers 26 to 28 are then selectively etched to form therein openings for exposing the top surfaces of the third layers of the coupling portions 13A and 13B. Next, the main pole 29 is formed on the dielectric layer 28, and the fourth layers of the coupling portions 13A and 13B are formed on the third layers of the coupling portions 13A and 13B. Next, the dielectric layer 30 is formed to cover the main pole 29 and the fourth layers of the coupling portions 13A and 13B. The dielectric layer 30 is then polished by, for example, CMP, until the main pole 29 and the fourth layers of the coupling portions 13A and 13B are exposed.

Next, the coil 31 is formed on the dielectric layer 30. The insulating layer 32 is then formed to cover the coil 31. Next, the yoke layer 33 is formed over the main pole 29, the fourth layers of the coupling portions 13A and 13B, the dielectric layer 30, and the insulating layer 32. Next, the protective layer 34 is formed to cover the yoke layer 33. Wiring, terminals, and other components are then formed on the top surface of the protective layer 34.

When the substructure is completed thus, the substructure is cut to separate the plurality of pre-head portions from each other, followed by the polishing of the medium facing surface 40 and the fabrication of flying rails etc. The thermally-assisted magnetic recording head is thereby completed.

Now, a method of manufacturing the near-field light generator according to the embodiment will be described. The method of manufacturing the near-field light generator according to the embodiment includes the steps of forming the first cladding layer 19; forming the core 21; forming the second cladding layer 24; forming the third cladding layer 25; and forming the plasmon generator 50. The following description includes the description of a method of manufacturing the waveguide according to the embodiment.

Reference is now made to FIG. 4 to FIG. 13 to describe steps to be performed after the formation of the first cladding layer 19 up to the formation of the plasmon generator 50. FIG. 4 to FIG. 13 each show a cross section of a stack of layers formed in the process of manufacturing the near-field light generator, the cross section being taken in the position where the medium facing surface 40 is to be formed.

Figure 4:
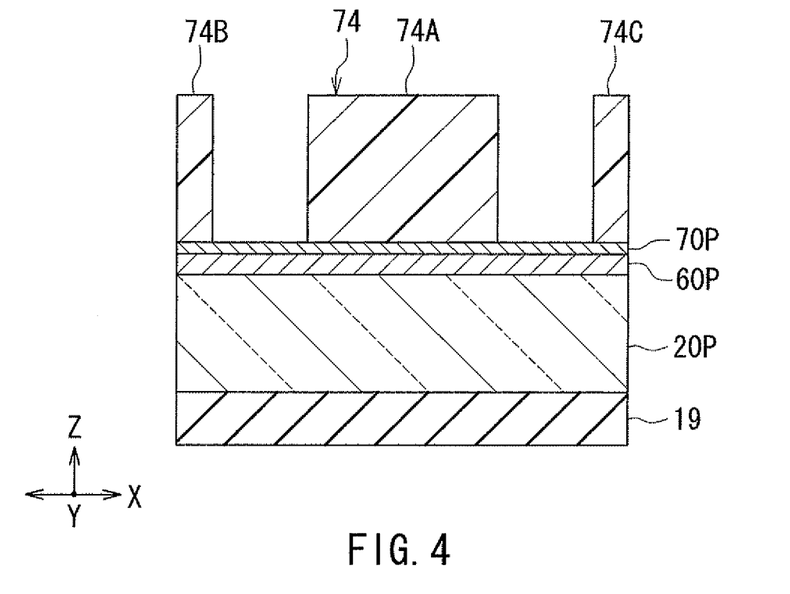
FIG. 4 is a cross-sectional view showing a step of a method of manufacturing the near-field light generator according to the embodiment of the invention.

FIG. 4 shows a step that follows the formation of the first cladding layer 19. In this step, first, a core material layer 20P is formed on the first cladding layer 19. The core material layer 20P later becomes the core 21, the first dummy core 22 and the second dummy core 23. Next, formed on the core material layer 20P is a metal material layer 60P which later becomes a polishing stopper layer, a first auxiliary polishing stopper layer and a second auxiliary polishing stopper layer to be described later. Next, formed on the metal material layer 60P is a metal material layer 70P which later becomes a peeling prevention layer, a first auxiliary peeling prevention layer and a second auxiliary peeling prevention layer to be described later. The metal material layer 60P is formed of Ru, for example. The metal material layer 70P is formed of NiCr, for example. The metal material layer 60P has a thickness of 100 nm, for example. The metal material layer 70P has a thickness of 10 nm, for example.

Next, a photoresist mask 74 is formed on the metal material layer 70P. The photoresist mask 74 is formed by patterning a photoresist layer by photolithography. The photoresist mask 74 includes a first portion 74A, a second portion 74B, and a third portion 74C described below. The first portion 74A has a planar shape (shape in a plan view) corresponding to the planar shape of the core 21, and lies above an area of the core material layer 20P where the core 21 will be formed later. The second portion 74B has a planar shape corresponding to the planar shape of the first dummy core 22, and lies above an area of the core material layer 20P where the first dummy core 22 will be formed later. The third portion 74C has a planar shape corresponding to the planar shape of the second dummy core 23, and lies above an area of the core material layer 20P where the second dummy core 23 will be formed later.

Figure 5:
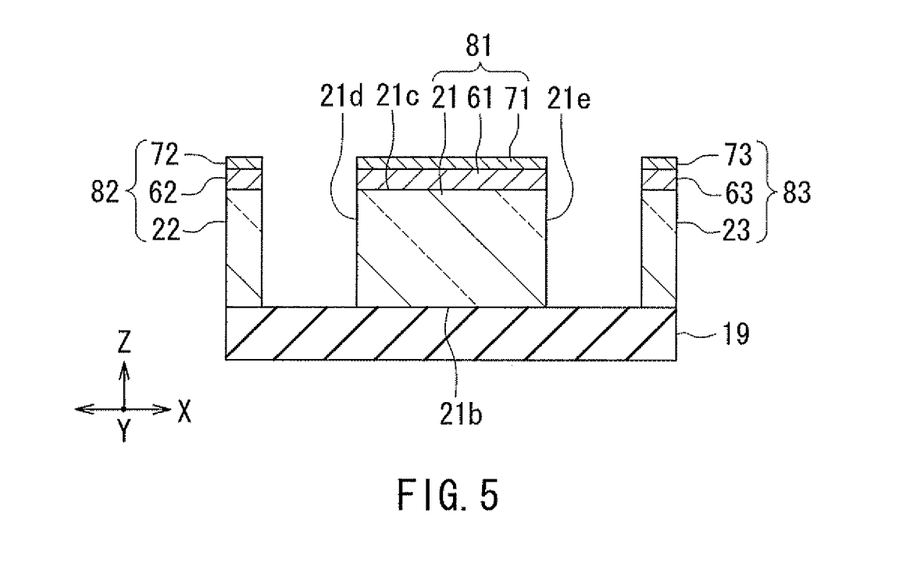
FIG. 5 is a cross-sectional view showing a step that follows the step shown in FIG. 4.

FIG. 5 shows the next step. In this step, first, portions of the metal material layers 60P and 70P other than the portions lying under the first to third portions 74A to 74C of the photoresist mask 74 are removed by ion beam etching (hereinafter referred to as IBE), for example. The remaining portions of the metal material layer 60P thereby become the polishing stopper layer 61, the first auxiliary polishing stopper layer 62 and the second auxiliary polishing stopper layer 73, while the remaining portions of the metal material layer 70P thereby become the peeling prevention layer 71, the first auxiliary peeling prevention layer 72 and the second auxiliary peeling prevention layer 73. The polishing stopper layer 61 and the peeling prevention layer 71 are located under the first portion 74A. The first auxiliary polishing stopper layer 62 and the first auxiliary peeling prevention layer 72 are located under the second portion 74B. The second auxiliary polishing stopper layer 63 and the second auxiliary peeling prevention layer 73 are located under the third portion 74C.

Next, the core material layer 20P is etched by, for example, reactive ion etching (hereinafter referred to as RIE), so that the core material layer 20P is patterned into the core 21, the first dummy core 22 and the second dummy core 23. In this step, the polishing stopper layer 61, the peeling prevention layer 71, and the first portion 74A of the photoresist mask 74 are used as a mask for forming the core 21. The first auxiliary polishing stopper layer 62, the first auxiliary peeling prevention layer 72, and the second portion 74B of the photoresist mask 74 are used as a mask for forming the first dummy core 22. The second auxiliary polishing stopper layer 63, the second auxiliary peeling prevention layer 73, and the third portion 74C of the photoresist mask 74 are used as a mask for forming the second dummy core 23. Where the core material layer 20P is formed of tantalum oxide, a gas containing $CF_4$ or a gas containing $Cl_2$ and $BCl_3$, for example, is used as the etching gas to etch the core material layer 20P by RIE. Then, the photoresist mask 74 is removed.

By patterning the core material layer 20P into the core 21, the first dummy core 22 and the second dummy core 23 as described above, a structure 81, a first auxiliary structure 82 and a second auxiliary structure 83 are formed on the first cladding layer 19. The first auxiliary structure 82 and the second auxiliary structure 83 are formed to be spaced from the structure 81 such that the structure 81 lies between the first and second auxiliary structures 82 and 83. The structure 81 includes the core 21, the polishing stopper layer 61 lying on the top surface 21c of the core 21, and the peeling prevention layer 71 lying on the top surface of the polishing stopper layer 61. The first auxiliary structure 82 includes the first dummy core 22, the first auxiliary polishing stopper layer 62 lying on the first dummy core 22, and the first auxiliary peeling prevention layer 72 lying on the first auxiliary polishing stopper layer 62. The second auxiliary structure 83 includes the second dummy core 23, the second auxiliary polishing stopper layer 63 lying on the second dummy core 23, and the second auxiliary peeling prevention layer 73 lying on the second auxiliary polishing stopper layer 63.

Figure 6:
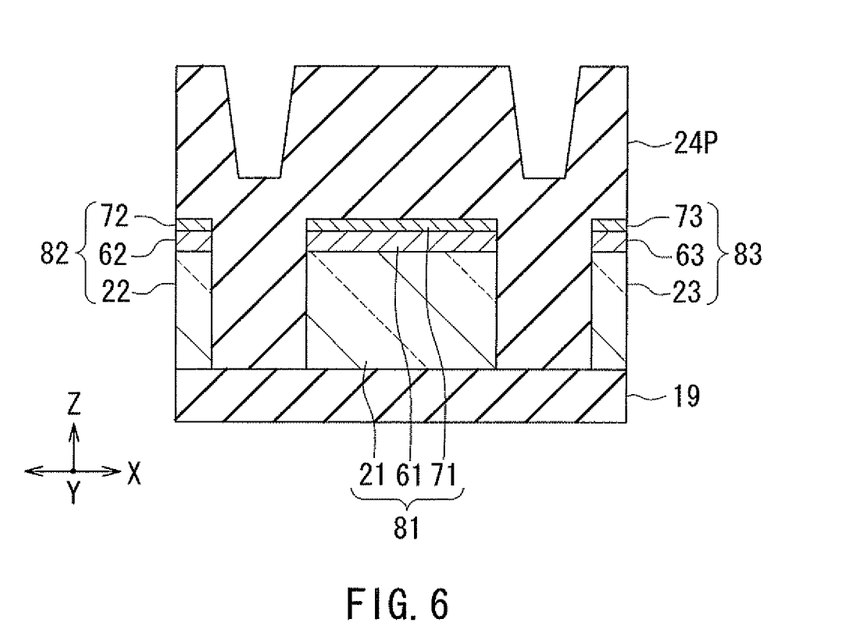
FIG. 6 is a cross-sectional view showing a step that follows the step shown in FIG. 5.

FIG. 6 shows the next step. In this step, a cladding material layer 24P, which later becomes the second cladding layer 24, is formed to cover the first cladding layer 19, the structure 81 and the auxiliary structures 82 and 83. The cladding material layer 24P is formed into such thickness that the top surfaces of portions of the cladding material layer 24P other than the portions lying on the structure 81 and the auxiliary structures 82 and 83 are located at a higher level than the peeling prevention layer 71 and the auxiliary peeling prevention layers 72 and 73.

If there are not provided the peeling prevention layer 71 and the auxiliary peeling prevention layers 72 and 73, some combinations of the material of the polishing stopper layer 61 and the auxiliary polishing stopper layers 62 and 63 (the material of the metal material layer 60P) and the material of the cladding material layer 24P may tend to result in peeling of the cladding material layer 24P away from the polishing stopper layer 61 and the auxiliary polishing stopper layers 62 and 63. The peeling prevention layer 71 and the auxiliary peeling prevention layers 72 and 73 are provided to prevent peeling of the cladding material layer 24P. Thus, a material that is highly adhesive to the polishing stopper layer 61, the auxiliary polishing stopper layers 62 and 63 and the cladding material layer 24P is selected as the material of the peeling prevention layer 71 and the auxiliary peeling prevention layers 72 and 73, i.e., the material of the metal material layer 70P. However, the peeling prevention layer 71 and the auxiliary peeling prevention layers 72 and 73 are not essential components in the present invention, and can be dispensed with.

Figure 7:
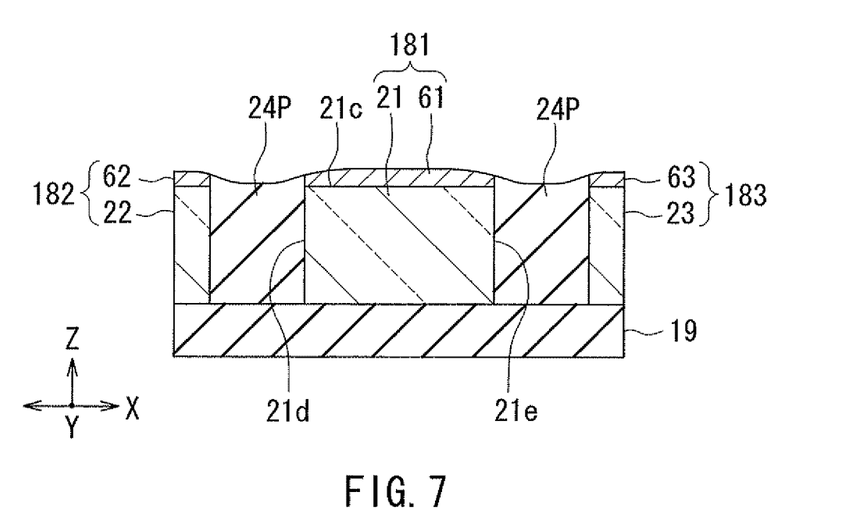
FIG. 7 is a cross-sectional view showing a step that follows the step shown in FIG. 6.

FIG. 7 shows the next step. In this step, the cladding material layer 24P, the peeling prevention layer 71, and the auxiliary peeling prevention layers 72 and 73 are polished until the polishing stopper layer 61 and the auxiliary polishing stopper layers 62 and 63 are exposed. This step will hereinafter be referred to as the first polishing step. The first polishing step completely removes the peeling prevention layer 71 and the auxiliary peeling prevention layers 72 and 73. The structure 81 after the removal of the peeling prevention layer 71 will be referred to as the polished structure 181, and the auxiliary structures 82 and 83 after the removal of the auxiliary peeling prevention layers 72 and 73 will be referred to as the polished auxiliary structures 182 and 183, respectively. The first polishing step is performed by CMP, for example. Where CMP is employed to polish the cladding material layer 24P, the polishing is performed, for example, with a slurry containing an alumina abrasive having a particle size of less than 0.2 μm and at a down force of less than 3 psi (1 psi=6.895 kPa).

As shown in FIG. 7, in the cladding material layer 24P after the polishing, a portion located between the core 21 and the dummy core 22 and a portion located between the core 21 and the dummy core 23 have their respective top surfaces that are concavely curved to be recessed relative to their surrounding surfaces. On the other hand, the polishing stopper layer 61 after the polishing has a top surface that is convexly curved to protrude relative to its surrounding surfaces. Although not illustrated, the auxiliary polishing stopper layers 62 and 63 after the polishing have their respective top surfaces that are convexly curved to protrude relative to their surrounding surfaces. The reason for which such shapes result is that once the surfaces being polished in the first polishing step have reached the polishing stopper layer 61 and the auxiliary polishing stopper layers 62 and 63, polishing of the polishing stopper layer 61 and the auxiliary polishing stopper layers 62 and 63 hardly proceeds whereas polishing of the cladding material layer 24P proceeds. The depth (the dimension in the Z direction) to which the top surface of the cladding material layer 24P is recessed falls within the range of 20 to 60 nm, for example.

Figure 8:
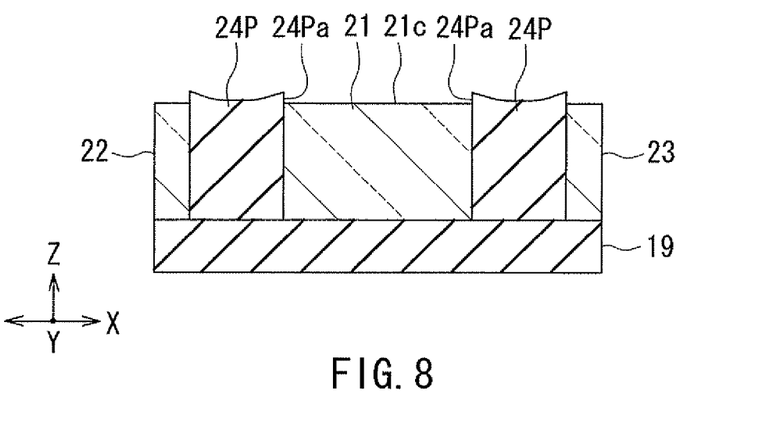
FIG. 8 is a cross-sectional view showing a step that follows the step shown in FIG. 7.

FIG. 8 shows the next step. In this step, the polishing stopper layer 61 and the auxiliary polishing stopper layers 62 and 63 are removed so that the cladding material layer 24P has a protruding portion 24Pa protruding upward to a higher level than the top surface 21c of the core 21. The removal of the polishing stopper layer 61 and the auxiliary polishing stopper layers 62 and 63 is effected by RIE, for example. Where the material of the polishing stopper layer 61 and the auxiliary polishing stopper layers 62 and 63 (the material of the metal material layer 60P) is Ru, a gas containing $O_2$ and $Cl_2$, for example, is used as the etching gas to etch the polishing stopper layer 61 and the auxiliary polishing stopper layers 62 and 63 by RIE. Such etching allows the polishing stopper layer 61 and the auxiliary polishing stopper layers 62 and 63 to be selectively removed while allowing the core 21, the dummy cores 22 and 23, and the cladding material layer 24P to be hardly etched. It is thereby possible to provide the cladding material layer 24P with the protruding portion 24Pa. The height (the dimension in the Z direction) of the protruding portion 24Pa with respect to the top surface 21c of the core 21 is in the range of 40 to 80 nm, for example.

Figure 9:
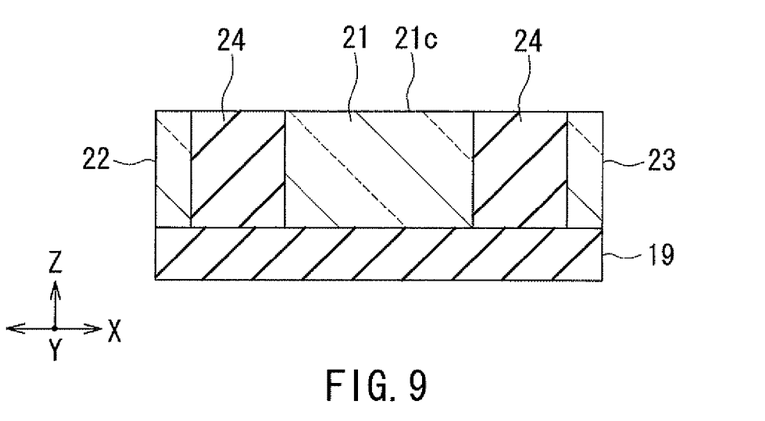
FIG. 9 is a cross-sectional view showing a step that follows the step shown in FIG. 8.

FIG. 9 shows the next step. In this step, the cladding material layer 24P is polished so as to remove the protruding portion 24Pa and thereby make the cladding material layer 24P into the second cladding layer 24. This step will hereinafter be referred to as the second polishing step. The second polishing step is performed by CMP, for example. Where CMP is employed to remove the protruding portion 24Pa, high-speed polishing is performed at a down force of less than 1 psi, for example. The polishing duration in this case is to be shorter than 20 seconds. This makes it possible to prevent the quality of the core 21 from being affected by heat and chemical reactions during the second polishing step.

Figure 10:
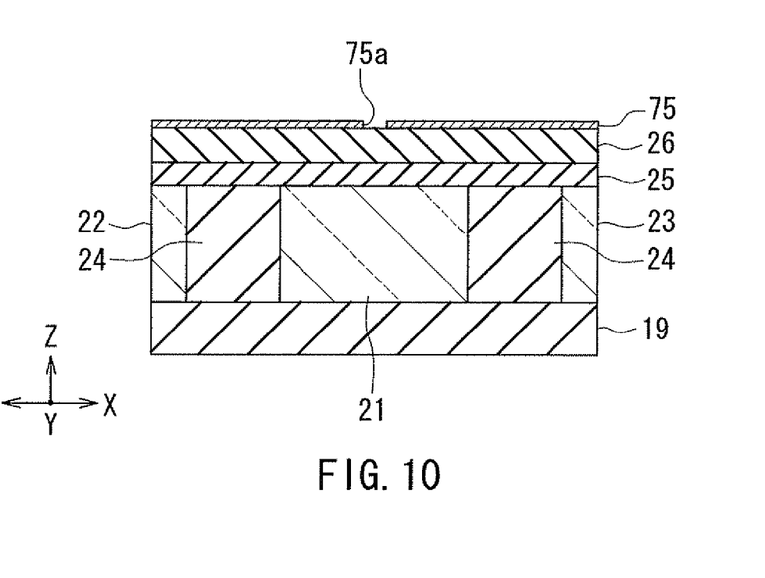
FIG. 10 is a cross-sectional view showing a step that follows the step shown in FIG. 9.

FIG. 10 shows the next step. In this step, first, the third cladding layer 25 is formed over the core 21, the dummy cores 22 and 23 and the second cladding layer 24. The dielectric layer 26 is then formed on the third cladding layer 25. Next, an etching mask 75 having an opening 75a shaped to correspond to the planar shape of the plasmon generator 50 is formed on the dielectric layer 26. The etching mask 75 is formed in the following manner, for example. First, an etching mask material layer that later becomes the etching mask 75 is formed. Then, a photoresist mask having an opening of the shape corresponding to the opening 75a is formed on the etching mask material layer. This photoresist mask is formed by patterning a photoresist layer by photolithography. Using the photoresist mask as an etching mask, a portion of the etching mask material layer that is exposed from the opening of the photoresist mask is then etched away by IBE, for example. This makes the etching mask material layer into the etching mask 75. The photoresist mask is then removed.

Figure 11:
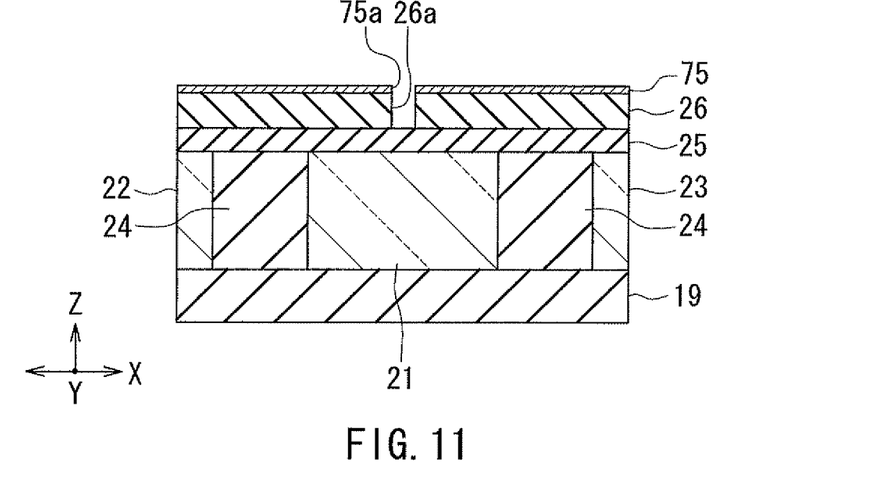
FIG. 11 is a cross-sectional view showing a step that follows the step shown in FIG. 10.

FIG. 11 shows the next step. In this step, first, the dielectric layer 26 is etched by, for example, RIE using the etching mask 75, whereby an accommodation part 26a for accommodating the plasmon generator 50 is formed in the dielectric layer 26. The etching mask 75 is then removed.

Figure 12:
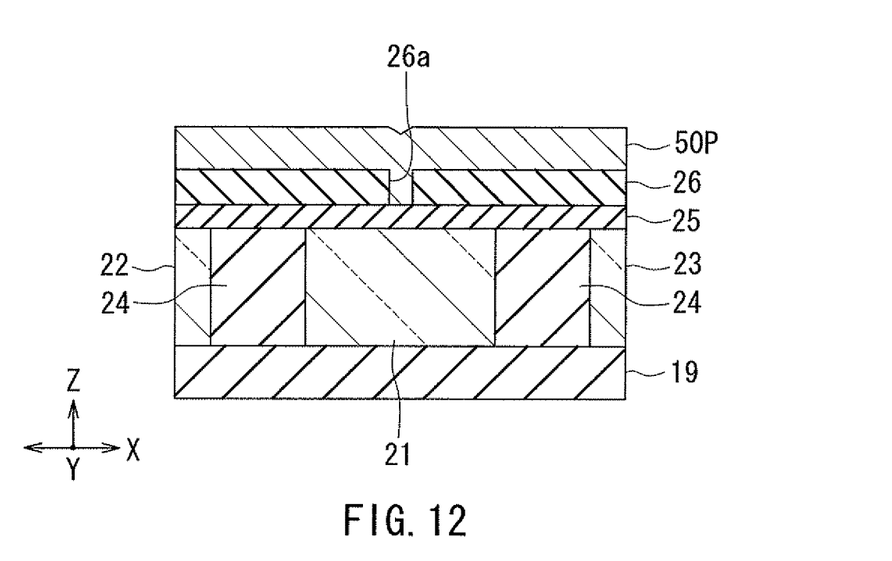
FIG. 12 is a cross-sectional view showing a step that follows the step shown in FIG. 11.

FIG. 12 shows the next step. In this step, a metal film 50P, which later becomes the plasmon generator 50, is formed to fill the accommodation part 26a. As shown in FIG. 12, the metal film 50P is formed also on the top surface of the dielectric layer 26.

Figure 13:
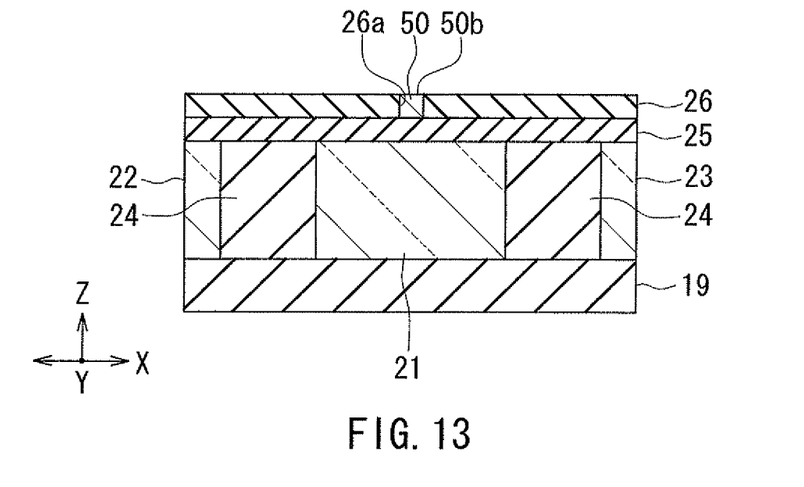
FIG. 13 is a cross-sectional view showing a step that follows the step shown in FIG. 12.

FIG. 13 shows the next step. In this step, the metal film 50P and the dielectric layer 26 are polished by, for example, CMP, so that the metal film 50P becomes the plasmon generator 50. The plasmon generator 50 is thereby completed. The thickness (the dimension in the Z direction) of the plasmon generator 50 is determined by the amount by which the metal film 50P and the dielectric layer 26 are polished.

The process from the step of forming the first cladding layer 19 to the step of forming the plasmon generator 50 shown in FIG. 13 corresponds to the method of manufacturing the near-field light generator according to the embodiment. The process from the step of forming the first cladding layer 19 to the step of forming the third cladding layer 25 shown in FIG. 10 corresponds to the method of manufacturing the waveguide according to the embodiment.

Figure 14:
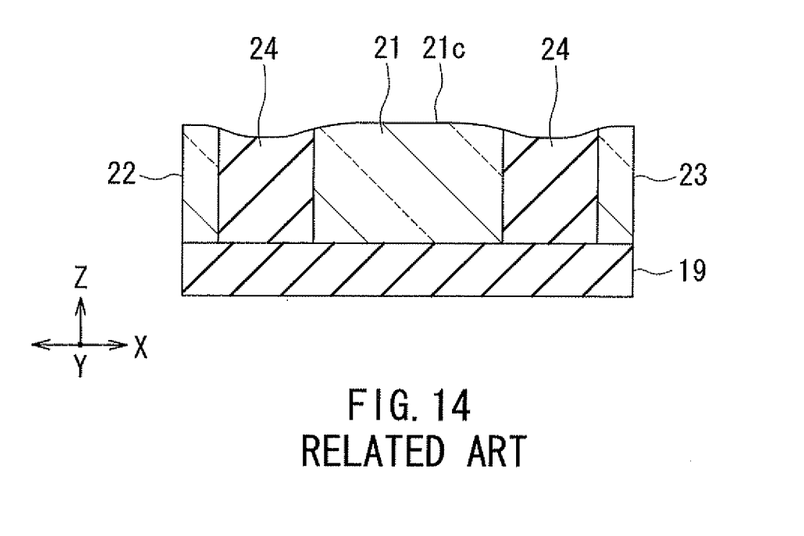
FIG. 14 is a cross-sectional view showing a step of a method of manufacturing a near-field light generator of a comparative example.

The embodiment makes it possible to improve the flatness of the top surface 21c of the core 21 and the top surface of the second cladding layer 24. This benefit will now be described in comparison with a manufacturing method for a near-field light generator of a comparative example. First, reference is made to FIG. 14 to describe the manufacturing method for the near-field light generator of the comparative example. FIG. 14 shows a cross section of a stack of layers formed in the process of manufacturing the near-field light generator, the cross section being taken in the position where the medium facing surface 40 is to be formed.

The manufacturing method for the near-field light generator of the comparative example is the same as the manufacturing method according to the embodiment up to the first polishing step shown in FIG. 7. The next step of the comparative example is to remove the polishing stopper layer 61 and the auxiliary polishing stopper layers 62 and 63 by IBE. At this time, the direction of travel of the ion beam is inclined at a great angle such as 65° relative to a direction perpendicular to the top surface 1a of the substrate 1 (see FIG. 2). FIG. 14 shows the stack after the removal of the polishing stopper layer 61 and the auxiliary polishing stopper layers 62 and 63. Then, the third cladding layer 25 is formed over the core 21, the dummy cores 22 and 23 and the second cladding layer 24. The subsequent steps are the same as those in the embodiment.

By performing IBE with the direction of travel of the ion beam inclined at a great angle relative to the direction perpendicular to the top surface 1a of the substrate 1 as described above, the etching rates of the core 21, the dummy cores 22 and 23, the cladding material layer 24P, the polishing stopper layer 61 and the auxiliary polishing stopper layers 62 and 63 become relatively close to each other. Accordingly, in the comparative example, as shown in FIG. 14, the top surface of the stack after the removal of the polishing stopper layer 61 and the auxiliary polishing stopper layers 62 and 63 is of a similar shape to that of the top surface of the stack after the first polishing step shown in FIG. 7. Thus, in the comparative example, the flatness of the top surface of each of the core 21 and the second cladding layer 24 is low.

In the embodiment, in contrast, after the first polishing step the polishing stopper layer 61 and the auxiliary polishing stopper layers 62 and 63 are selectively removed by RIE so that the cladding material layer 24P has the protruding portion 24Pa. This makes it possible to expose the flat top surface 21c of the core 21 and prevent the top surface 21c from being curved. Thereafter, the cladding material layer 24P is polished by CMP in the second polishing step so that the protruding portion 24Pa is removed. It is thereby possible to eliminate a difference in level between the top surface 21c of the core 21 and its surrounding surfaces while allowing the top surface 21c of the core 21 to remain flat. According to the embodiment, it is thus possible to improve the flatness of the top surface of each of the core 21 and the second cladding layer 24. Consequently, the embodiment allows the top surface of each of the plasmon generator 50 and the dielectric layer 26 to be of high flatness after the step of polishing the metal film 50P and the dielectric layer 26 shown in FIG. 13, thereby allowing accurate control of the thickness of the plasmon generator 50.

A description will now be given of the effects obtained by forming the auxiliary structures 82 and 83 in addition to the structure 81 in the step of forming the structure 81 shown in FIG. 5. If there are not the auxiliary structures 82 and 83, the level of the top surface of the cladding material layer 24P after the first polishing step shown in FIG. 7 gradually becomes lower with increasing distance from the polished structure 181. If the top surface of the cladding material layer 24P has such a shape, a difficulty may arise in the second polishing step shown in FIG. 9. To address this problem, in the embodiment, the auxiliary structures 82 and 83 are formed such that the structure 81 lies therebetween. This makes it possible to prevent the level of the top surface of the portion of the cladding material layer 24P located between the polished structure 181 and the polished auxiliary structure 182 and the level of the top surface of the portion of the cladding material layer 24P located between the polished structure 181 and the polished auxiliary structure 183 from being excessively low after the first polishing step. It is thus possible to prevent any difficulty in the second polishing step from arising due to the shape of the top surface of the cladding material layer 24P after the first polishing step.

Further, by forming the structure 81 and the auxiliary structures 82 and 83 simultaneously in the step of forming the structure 81 shown in FIG. 5, the side surface 21d of the core 21 and the side surface of the dummy core 22 opposed thereto can be easily formed to be perpendicular to the top surface 1a of the substrate 1, and similarly, the side surface 21e of the core 21 and the side surface of the dummy core 23 opposed thereto can be easily formed to be perpendicular to the top surface 1a of the substrate 1. The embodiment thus allows the two side surfaces 21d and 21e of the core 21 to be easily formed to be perpendicular to the top surface 1a of the substrate 1.

The present invention is not limited to the foregoing embodiment, and various modifications may be made thereto. For example, the auxiliary structures 82 and 83 are not essential components of the present invention, and can be dispensed with. Further, as far as the requirements of the appended claims are met, the shapes of the core 21, the plasmon generator 50 and the main pole 29 are not limited to the examples illustrated in the foregoing embodiment, and can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A method of manufacturing a near-field light generator including a waveguide and a plasmon generator, wherein the waveguide includes a core through which light propagates, and a cladding provided around the core, the core has a bottom surface, a top surface opposite to the bottom surface, and two side surfaces connecting the top and bottom surfaces to each other, the cladding includes a first cladding layer in contact with the bottom surface of the core, a second cladding layer in contact with the two side surfaces of the core, and a third cladding layer in contact with the top surface of the core, the plasmon generator is disposed above the top surface of the core and has a plasmon exciting part configured to excite a surface plasmon through coupling with evanescent light generated from the top surface of the core, and a front end face that generates near-field light based on the surface plasmon, the method of manufacturing the near-field light generator comprising:

a step of forming the first cladding layer;

a step of forming a structure on the first cladding layer, the structure including the core and a polishing stopper layer disposed on the top surface of the core;

a step of forming a cladding material layer to cover the first cladding layer and the structure, the cladding material layer becoming the second cladding layer later;

a first polishing step of polishing the cladding material layer until the polishing stopper layer is exposed;

a step of removing the polishing stopper layer after the first polishing step so that the cladding material layer has a protruding portion protruding upward to a higher level than the top surface of the core;

a second polishing step of polishing the cladding material layer after the step of removing the polishing stopper layer so as to remove the protruding portion and thereby make the cladding material layer into the second cladding layer; and a step of forming the third cladding layer and the plasmon generator after the second polishing step.

2. The method of manufacturing the near-field light generator according to claim 1, wherein the first polishing step and the second polishing step are performed by chemical mechanical polishing.

3. The method of manufacturing the near-field light generator according to claim 1, wherein the step of forming the structure includes: a step of forming a core material layer on the first cladding layer, the core material layer becoming the core later; a step of forming the polishing stopper layer on the core material layer; and a step of etching the core material layer using the polishing stopper layer as a mask so that the core material layer is patterned into the core.

4. The method of manufacturing the near-field light generator according to claim 1, wherein the step of removing the polishing stopper layer is performed by reactive ion etching.

5. The method of manufacturing the near-field light generator according to claim 1, wherein the step of forming the structure forms a first auxiliary structure and a second auxiliary structure in addition to the structure, the first and second auxiliary structures being spaced from the structure and disposed on the first cladding layer such that the structure lies between the first and second auxiliary structures, the first auxiliary structure includes a first dummy core formed of the same material as the core, and a first auxiliary polishing stopper layer disposed on the first dummy core, the second auxiliary structure includes a second dummy core formed of the same material as the core, and a second auxiliary polishing stopper layer disposed on the second dummy core, in the step of forming the cladding material layer, the cladding material layer is formed to cover the first cladding layer, the structure, the first auxiliary structure and the second auxiliary structure, in the first polishing step, the cladding material layer is polished until the polishing stopper layer, the first auxiliary polishing stopper layer and the second auxiliary polishing stopper layer are exposed, and in the step of removing the polishing stopper layer, the first and second auxiliary polishing stopper layers are removed in addition to the polishing stopper layer.

6. The method of manufacturing the near-field light generator according to claim 5, wherein the step of forming the structure includes: a step of forming a core material layer on the first cladding layer, the core material layer becoming the core, the first dummy core and the second dummy core later; a step of forming the polishing stopper layer, the first auxiliary polishing stopper layer and the second auxiliary polishing stopper layer on the core material layer; and a step of etching the core material layer using the polishing stopper layer, the first auxiliary polishing stopper layer and the second auxiliary polishing stopper layer as masks so that the core material layer is patterned into the core, the first dummy core and the second dummy core.

7. A method of manufacturing a waveguide included in a near-field light generator, wherein the near-field light generator includes the waveguide and a plasmon generator, the waveguide includes a core through which light propagates, and a cladding provided around the core, the core has a bottom surface, a top surface opposite to the bottom surface, and two side surfaces connecting the top and bottom surfaces to each other, the cladding includes a first cladding layer in contact with the bottom surface of the core, a second cladding layer in contact with the two side surfaces of the core, and a third cladding layer in contact with the top surface of the core, the plasmon generator is disposed above the top surface of the core and has a plasmon exciting part configured to excite a surface plasmon through coupling with evanescent light generated from the top surface of the core, and a front end face that generates near-field light based on the surface plasmon, the method of manufacturing the waveguide comprising:

a step of forming the first cladding layer;

a step of forming a structure on the first cladding layer, the structure including the core and a polishing stopper layer disposed on the top surface of the core;

a step of forming a cladding material layer to cover the first cladding layer and the structure, the cladding material layer becoming the second cladding layer later;

a first polishing step of polishing the cladding material layer until the polishing stopper layer is exposed;

a step of removing the polishing stopper layer after the first polishing step so that the cladding material layer has a protruding portion protruding upward to a higher level than the top surface of the core;

a second polishing step of polishing the cladding material layer after the step of removing the polishing stopper layer so as to remove the protruding portion and thereby make the cladding material layer into the second cladding layer; and a step of forming the third cladding layer after the second polishing step.

8. The method of manufacturing the waveguide according to claim 7, wherein the first polishing step and the second polishing step are performed by chemical mechanical polishing.

9. The method of manufacturing the waveguide according to claim 7, wherein the step of forming the structure includes: a step of forming a core material layer on the first cladding layer, the core material layer becoming the core later; a step of forming the polishing stopper layer on the core material layer; and a step of etching the core material layer using the polishing stopper layer as a mask so that the core material layer is patterned into the core.

10. The method of manufacturing the waveguide according to claim 7, wherein the step of removing the polishing stopper layer is performed by reactive ion etching.

11. The method of manufacturing the waveguide according to claim 7, wherein the step of forming the structure forms a first auxiliary structure and a second auxiliary structure in addition to the structure, the first and second auxiliary structures being spaced from the structure and disposed on the first cladding layer such that the structure lies between the first and second auxiliary structures, the first auxiliary structure includes a first dummy core formed of the same material as the core, and a first auxiliary polishing stopper layer disposed on the first dummy core, the second auxiliary structure includes a second dummy core formed of the same material as the core, and a second auxiliary polishing stopper layer disposed on the second dummy core, in the step of forming the cladding material layer, the cladding material layer is formed to cover the first cladding layer, the structure, the first auxiliary structure and the second auxiliary structure, in the first polishing step, the cladding material layer is polished until the polishing stopper layer, the first auxiliary polishing stopper layer and the second auxiliary polishing stopper layer are exposed, and in the step of removing the polishing stopper layer, the first and second auxiliary polishing stopper layers are removed in addition to the polishing stopper layer.

12. The method of manufacturing the waveguide according to claim 11, wherein the step of forming the structure includes: a step of forming a core material layer on the first cladding layer, the core material layer becoming the core, the first dummy core and the second dummy core later; a step of forming the polishing stopper layer, the first auxiliary polishing stopper layer and the second auxiliary polishing stopper layer on the core material layer; and a step of etching the core material layer using the polishing stopper layer, the first auxiliary polishing stopper layer and the second auxiliary polishing stopper layer as masks so that the core material layer is patterned into the core, the first dummy core and the second dummy core.

* * * * *